United States Patent Office 3,554,769
Patented Jan. 12, 1971

3,554,769
FLAVORING COMPOSITION
James Jerry Caillouet, P.O. Box 4108,
Huntsville, Ala. 35902
No Drawing. Filed Dec. 5, 1967, Ser. No. 687,973
Int. Cl. A23l 1/00, 1/22
U.S. Cl. 99—140                5 Claims

ABSTRACT OF THE DISCLOSURE

A composition having a synthetically produced lemon flavor, is made by combining a major proportion of citric acid, and minor proportions of oil of lemon and oil of sweet orange. The two oils may vary in quantity relative to one another, and the composition may be made in the form of tablets, powders or liquid. Additional components may be included in the composition, depending primarily upon the form (powder, tablets, liquid) in which the composition is to be marketed.

---

This invention relates to a flavoring composition and is more particularly concerned with the production of a flavoring composition having a real lemon flavor.

The primary object of the invention is to provide a mixture composed of readily available ingredients capable of imparting thereto the flavor as well as the aroma of lemon.

Another object of the invention is to provide a mixture of the character set forth, and which can be formulated to include additional components for furnishing additional desired properties to the product.

Stated briefly, the primary object of the invention may be achieved by forming a mixture composed of citric acid, lemon oil and oil of sweet orange.

I have found that by combining the three aforementioned components in certain proportions, as hereinafter more specifically set forth, there is obtained a basic composition which is characterized by a real lemon flavor and taste. By this is meant that the basic composition possesses a flavor closely resembling, i.e., substantially duplicating, that of real fresh lemon.

The above-mentioned property of the composition is unexpected and unique. It is believed to be attributable to the oil of sweet orange and/or the blending thereof with the lemon oil. If one were to compare the taste of the composition containing the oil of sweet orange with the taste of the composition not containing the same, a significant taste difference would be readily noted.

In terms of specific formulation, the flavoring composition of the present invention is basically composed of the above-named ingredients, in substantially the following relative proportions:

|  | Grams |
|---|---|
| Citric acid | 437.5 |
| Lemon oil (U.S.P. "magna") | 6.6–12.12 |
| Oil of sweet orange | 3.0–4.0 |

In carrying out the invention in accordance with the foregoing formulation, the lemon oil will be utilized in an amount at the lower end of the indicated range when it is desired that the product be in the form of tablets and powders. The amount of lemon oil can be reduced to as low as 2.2 grams in the above formulation, utilizing 437.5 grams of citric acid, and will provide the same general flavor in the composition, but to a much lesser intensity. Lemon oil in an amount less than 2.2 grams will not appreciably affect the flavor of the citric acid. In other words, less than 2.2 grams of lemon oil mixed with the above-stated amount of citric acid will not alter the taste of citric acid; wherein 6.6 grams lemon oil impart the desired flavor. At the opposite end of the above-indicated range of lemon oil, the 12.12 grams of lemon oil is an amount which appears to be the maximum required for production of the composition in liquid form. A quantity of lemon oil in excess of 12.12 grams even to the extent of three or four times that quantity, does not appreciably increase the lemon flavor of the product. Thus, as much as 50 to 60 grams of lemon oil could be utilized in the above formulation, and the same flavor obtained. Accordingly, economy dictates the use of the 12.12 grams indicated.

Insofar as concerns the amount of oil of sweet orange in the basic formula above set forth, the three gram quantity has been found to serve, in conjunction with the lemon oil and citric acid, to produce the desirable lemon flavor in powder products. The four gram quantity of oil of sweet orange has been found to be the most desirable for producing products in the form of liquid emulsions. Here again, an amount in excess of the amount herein specified as the upper end of the range of oil of sweet orange utilized in the basic formula, even to the extend of several times the stated amount affords little or no increase in flavor.

As indicated above, the basic composition consisting of the mixture of citric acid, lemon oil and oil of sweet orange, may desirably have certain additional ingredients combined therewith, depending mainly upon the physical form (powder, tablet, liquid), in which the product is to be marketed.

These additional components are:

Ascorbic acid
Acetylsalicylic acid
Mannitol
Food coloring
Water.

These ingredients are utilized in the following amounts, relative to the amount of citric acid in the basic composition:

Ascorbic acid—3% when intended to serve only for its value as vitamin;
Ascorbic acid—20% when intended to serve for its value as vitamin, and as filler and absorbing agent for any excess essential oils, thereby to produce the product in the form of a completely dry powder;
Acetylsalicylic acid—5% to serve as a covering or masking agent, i.e., one which is extremely difficult to separate from other components of mixture;
Mannitol—less than 10% as a binder for forming tablets and to resist fermentation;
Food coloring—depending upon intensity desired;
Water—40% to 70%.

The actual manufacture of the composition hereof involves merely simply mixing the ingredients mentioned, no heating or the like being necessary. It is essential merely that the ingredients be mixed thoroughly and uniformly.

In actual practice, it is preferred to utilize the following mixing order and procedure:

(1) Place the citric acid in the mixing vessel;
(2) Add the lemon oil and stir to mix thoroughly;
(3) Add the oil of sweet orange while continuing to stir;
(4) After the foregoing ingredients have been stirred to a uniform mixture, add ascorbic acid (to absorb the excess oils), mix thoroughly;
(5) Add acetylsalicylic acid and mix to uniformity.

To the mixed product as thus produced, there may be added Mannitol N.F. to convert the same into tablets, cubes or similar solid forms; or by addition of water the mixture may be emulsified in a Waring Blendor or other suitable emulsifying apparatus.

I claim:

1. A flavoring composition characterized by exhibiting the flavor of real lemon and consisting essentially of the following ingredients in the proportions of approximately 437.5 grams of citric acid, a minor proportion of lemon oil in an amount of at least 2.2 grams and a minor proportion of oil of sweet orange in an amount of at least 3.0 grams.

2. A flavoring composition as defined in claim 1, wherein the said ingredients are present in the proportions of approximately 437.5 grams citric acid, approximately 6.6 to 12.12 grams lemon oil, and approximately 3.0 to 4.0 grams oil of sweet orange.

3. A flavoring composition as defined in claim 2, and containing approximately 3% ascorbic acid.

4. A flavoring composition as defined in claim 2, and containing approximately 20% ascorbic acid.

5. A flavoring composition as defined in claim 2, and containing approximately 5% acetylsalicylic acid.

References Cited

UNITED STATES PATENTS

| 2,555,465 | 6/1951 | Bogin et al. | 99—140 |
| 3,118,771 | 1/1964 | Albrecht | 99—140 |

FOREIGN PATENTS

| 284,278 | 1/1927 | Great Britain | 99—28 |
| 879,325 | 10/1961 | Great Britain | 99—28 |

RAYMOND N. JONES, Primary Examiner

W. BOVEE, Assistant Examiner

U.S. Cl. X.R.

99—28, 78